UNITED STATES PATENT OFFICE.

RUSSELL FISK, OF NEW YORK, N. Y.

IMPROVEMENT IN CONCRETE PAVEMENTS.

Specification forming part of Letters Patent No. 69,738, dated October 8, 1867; antedated July 20, 1867; Reissue No. 3,296, dated February 9, 1869.

*To all whom it may concern:*

Be it known that I, RUSSELL FISK, of New York, in the county and State of New York, have invented a new and Improved Composition for Concrete Pavements; and I do hereby declare that the following is a full, clear, and exact description of the same.

The invention consists in a composition of pine-tar, coal-tar, broken stone, cinders, or coarse gravel, coal-ashes, and sharp sand, with the addition of carbo-japanis, pitch, cement, asphaltum, sulphur, rosin, plaster, or lime, either or all, as the season, climate, state of the soil, location, or other circumstances may demand.

To enable others skilled in the art to make and use my invention, I will proceed to describe the same.

I take of broken stone, coarse gavel, or cinders, either or all, and, when dust, sand, or other fine material is mixed with these, run them over a common mason's screen, and then mix them well with hot pine and coal tar till every part is well smeared. This is then spread, on a smooth hard foundation, two (2) to four (4) inches thick, and well rolled with heavy stone rollers. I then take sharp sand, with or without screened coal-ashes, and either or all the additional articles above mentioned, as the circumstances demand, and thoroughly mix with hot tar and melted carbo-japanis, pitch, asphaltum, or rosin till every particle is smeared, and then spread this over the first coat and roll with heavy rollers. I also take the material for the last coat and put it into molds and heavily press it, so as to make blocks for pavement, and, after they have stood for a few days to harden, I lay them down, and cement with tar and sand, so as to make one solid surface or body.

The advantages of this kind of pavement are its durability and cheapness. It is water-tight and frost-proof, easy for man and beast to travel upon, pleasant to the eye, keeps an even surface, and grows harder by use. It is adapted for walks, street-pavements, cellar-bottoms, vault-covers, floors for warehouses and cellars, and all similar purposes.

Having thus fully described my invention, what I claim as new, and desire to secure by Letters Patent, is—

1. The mode, substantially as set forth, of compounding and preparing concrete and making concrete blocks for paving.

2. The mode of laying pavements by the use of concrete and laying concrete blocks embedded and united substantially as set forth.

RUSSELL FISK.

Witnesses:

ALFRED A. RANNEY,

E. W. RANNEY.